K. A. HAWLEY.
ELECTRIC SIGNALING SYSTEM.
APPLICATION FILED FEB. 7, 1908.

1,036,620.

Patented Aug. 27, 1912.

Witnesses:

Inventor
Kent A. Hawley
by
Attys.

UNITED STATES PATENT OFFICE.

KENT A. HAWLEY, OF LOS ANGELES, CALIFORNIA, ASSIGNOR TO SIMMEN AUTOMATIC RAILWAY SIGNAL COMPANY, OF LOS ANGELES, CALIFORNIA, A CORPORATION OF ARIZONA.

ELECTRIC SIGNALING SYSTEM.

1,036,620.   Specification of Letters Patent.   Patented Aug. 27, 1912.

Application filed February 7, 1908. Serial No. 414,817.

*To all whom it may concern:*

Be it known that I, KENT A. HAWLEY, a citizen of the United States, residing at Los Angeles, in the county of Los Angeles and State of California, have invented a new and useful Electric Signaling System, of which the following is a specification.

The main object of the present invention is to provide means for indicating a defective condition or a variation of current in an electric circuit, particularly in an electric signal circuit.

A further object of the invention is to provide a signal circuit wherein the normal signal is effected by the front contact operation of the relay, and, therefore, by the positive action of the electromagnet, in distinction to the relatively uncertain operation of gravity, or a spring, and at the same time any defective condition in the signal circuit will be indicated or announced.

Figure 1:
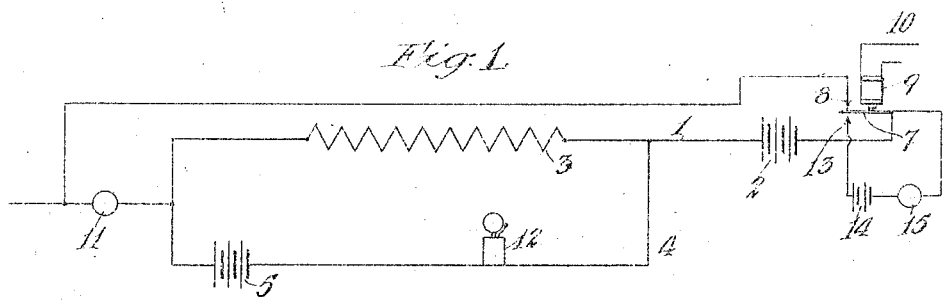
Figure 2:
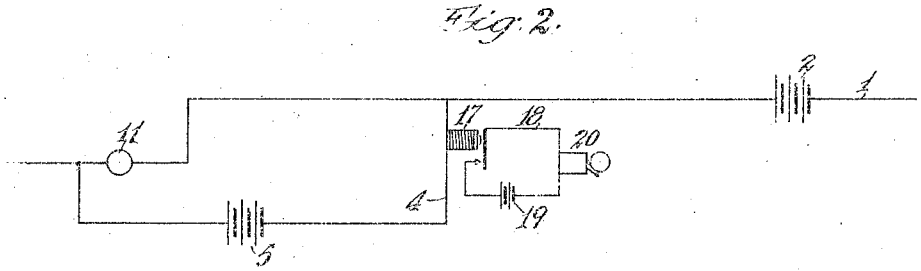
Figure 3:
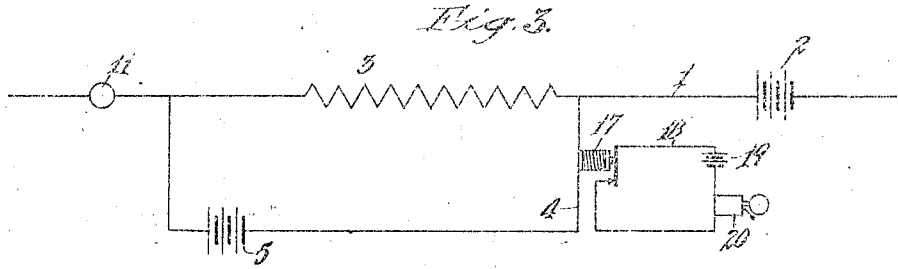

In the accompanying drawings: Figure 1 is a diagram showing the application of the invention in connection with a signal, for example, an electric railway signal. Fig. 2 is a diagram showing another arrangement of the signal circuit. Fig. 3 is a diagram showing a still further modification.

Referring to Fig. 1, 1 designates a circuit, and 2 a source of electric energy therein. In this circuit is included a resistance 3 and in a shunt 4 around or embracing this resistance is included a battery 5, for example, a secondary battery, and an indicator 12, which may be a galvanometer, electric lamp, bell, or other visual or audible indicating device. Circuit 1 being in operative condition, the current flowing through the same from the battery 2 will cause a difference of potential at the ends of resistance 3 represented by the product of the resistance and the current flowing therethrough and the battery 5 is of just sufficient strength to counterbalance this difference of potential so that normally there will be no current flowing through the branch or second circuit 4, and the indicator 12 will be inoperative. Lack of operation of indicator 12, therefore, shows a normal condition in the operating line 1. If there is a variation of current or any failure of line 1 to operate by reason of deficiency of battery therein, defective contacts, or break, etc., in the line, the difference of potential at the ends of resistance 3, due to the action of battery 2, will be decreased, or in case of a break, will be eliminated, so that the battery 5 will send an unopposed current through the branch circuit 4 thus operating the indicator 12 and showing the variation or defective condition of the line.

In applying the invention to a signaling system, for example a railway signal, the circuit 1 is assumed to be a primary signal circuit, closed by the armature 7 and front contact 8 of a relay 9 in the main line circuit 10. The circuit is assumed to be a normal safety circuit, the main line 10 being normally closed, and through the relay 9 and its armature 7 holding the primary signal circuit 1 closed. In this circuit 1 in this case is included a safety signal 11, for example, a green light, which maintains operation as long as there is no variation in circuit 1 and the condition is that of safety. Under these conditions, the drop of potential in resistance 3 is normal and is balanced by battery 5, and the battery 5 sends no current through the signal, or bell 12, which is included in the local shunt of the branch 4. Relay 9 has a back contact 13 connected in a local circuit including the battery 14, for example, a red light 15, this being the danger signal for operation by the line.

It is considered undesirable to depend, in a signal system, for operation of a relay on its back contact, but it will be noted that in this case there is in addition to the danger signal at 15 a normal safety signal 11 controlled by the front contact and as long as the circuits are in operative condition the clear or safety signal is given at 11 by the positive operation of the relay. If the primary signal circuit 1 is defective in any part by reason of a break, failure of the battery or defective contact at the relay, the flow of current from the battery 2 through resistance 3 will be reduced or eliminated and the electromotive force of battery 5 no longer being opposed by the difference of potential at ends of resistance 3, sends a current through the signaling means 12 in the second circuit 4 announcing to the person in charge that the primary signaling circuit is defective.

The signal lamp, or means 11, may be used as the resistance around which the shunt 4 is connected, as shown in Fig. 2, the drop of potential in the lamp balancing the electromotive force of the battery 5. In this figure is also shown the use of a relay 17 as a signal means for indicating the defective condition of the circuit, said relay being included in the branch 4 and controlling a local, or fourth, circuit 18 including a battery 19 and a bell 20 so that when the relay 17 becomes operative on unbalancing of conditions in the third circuit 4, the bell 20 in the third circuit announces the defective condition. Such a relay may also be used in connection with a special resistance 3 for maintaining a difference of potential at the ends of the branch circuit 4, as shown in Fig. 3.

It will be understood that in the application of the invention to a railway signal, the signal circuit 1 shown in Figs. 2 and 3 is connected to be operated by the line as in Fig. 1. The bell 12 of Fig. 1 and the relay 17 of Figs. 2 and 3 are responsive only to a definite condition of current strength in the primary circuit 1 so that positive notification is given when this condition occurs.

What I claim is:—

1. A primary signal circuit including a normally operated signal, a main circuit and a relay therein having a normally closed front contact controlling the signal circuit, a resistance in said signal circuit, a third circuit embracing said resistance, a source of electromotive force in said third circuit balancing the difference of potential at the ends of said resistance due to the normal signal current flowing through said resistance, and indicating means in the third circuit.

2. A primary signal circuit including a normally operated safety signal, a main circuit and a relay therein having a front contact controlling said signal circuit, and having a back contact, a resistance in said signal circuit, a third circuit embracing said resistance, a source of electromotive force in said third circuit, balancing the difference of potential at the ends of said resistance due to the normal signal current flowing through said resistance, indicating means in said third circuit, and a danger signal circuit connected to the aforesaid back contact of the main circuit relay and including a danger signal.

In testimony whereof, I have hereunto set my hand at Los Angeles, California, this 31st day of January 1908.

KENT A. HAWLEY.

In presence of—
GEORGE T. HACKLEY,
FRANK L. A. GRAHAM.